United States Patent
Ahsbahs et al.

(10) Patent No.: US 6,682,194 B2
(45) Date of Patent: *Jan. 27, 2004

(54) PROGRESSIVE MULTIFOCAL OPHTHALMIC LENS WITH RAPID POWER VARIATION

(75) Inventors: Francoise Ahsbahs, Saint Maur des Fosses (FR); Pierre Devie, Chevily Larue (FR)

(73) Assignee: Essilor International, Charenton Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/062,608

(22) Filed: Jan. 31, 2002

(65) Prior Publication Data

US 2002/0176048 A1 Nov. 28, 2002

(30) Foreign Application Priority Data

Feb. 2, 2001 (FR) .............................. 01 01411

(51) Int. Cl.$^7$ ................................................. G02C 7/06
(52) U.S. Cl. ...................................... 351/169; 351/168
(58) Field of Search ............................... 351/169, 168, 351/170–172

(56) References Cited

U.S. PATENT DOCUMENTS

| 5,270,745 | A | | 12/1993 | Pedrono | 351/169 |
|---|---|---|---|---|---|
| 5,272,495 | A | | 12/1993 | Pedrono | 351/169 |
| 5,488,442 | A | | 1/1996 | Harsigny et al. | 351/169 |
| 5,719,658 | A | | 2/1998 | Ahsbahs et al. | 351/169 |
| 5,949,519 | A | * | 9/1999 | Le Saux et al. | 351/169 |
| 6,102,544 | A | * | 8/2000 | Baudart et al. | 351/169 |
| 6,220,705 | B1 | | 4/2001 | Francois et al. | 351/169 |
| 6,318,859 | B1 | | 11/2001 | Baudart et al. | 351/169 |
| 6,540,354 | B2 | * | 4/2003 | Chaveau et al. | 351/169 |
| 2002/0180928 | A1 | * | 12/2002 | Ahsbahs et al. | 351/161 |

* cited by examiner

Primary Examiner—Jordan M. Schwartz
Assistant Examiner—Jessica Stultz
(74) Attorney, Agent, or Firm—Fish & Richardson P.C.

(57) ABSTRACT

A progressive multifocal ophthalmic lens having a far vision region, an intermediate vision region and a near vision region, a main meridian of progression passing through said three regions, and a power addition equal to a difference in mean sphere between a near vision region control point and a far vision region control point is provided. The lens has a progression length less than 12 mm, defined as the vertical distance between a mounting center and a point on the meridian where mean sphere is greater than mean sphere at the far vision control point by 85% of the power addition value. To ensure good visual characteristics not only around the meridian, but also in regions of extra-foveal vision, the ratio between the integral of the product of cylinder times the norm of sphere gradient, on a 40 mm diameter circle centered on the center of the lens, and the product of the area of this circle, power addition and a maximum value of the norm of sphere gradient over that part of the meridian comprised within this circle is less than 0.14.

22 Claims, 5 Drawing Sheets

PROGRESSIVE MULTIFOCAL OPHTHALMIC LENS WITH RAPID POWER VARIATION

BACKGROUND OF THE INVENTION

The present invention relates to multifocal ophthalmic lenses. Such lenses are well known; they provide an optical power which varies continuously as a function of the position on the lens; typically when a multifocal lens is mounted in a frame, the power in the bottom of the lens is greater than the power in the top of the lens.

In practice, multifocal lenses often comprise an aspherical face, and a face which is spherical or toric, machined to match the lens to the wearer's prescription. It is therefore usual to characterize a multifocal lens by the surface parameters of its aspherical surface, namely at every point a mean sphere S and a cylinder.

The mean sphere S is defined by the following formula:

$$S = \frac{n-1}{2}\left(\frac{1}{R_1} + \frac{1}{R_2}\right)$$

where $R_1$ and $R_2$ are the minimum and maximum radii of curvature, expressed in meters, and n is the refractive index of the lens material.

The cylinder is given, using the same conventions, by the formula:

$$C = (n-1)\left|\frac{1}{R_1} - \frac{1}{R_2}\right|$$

Such multifocal lenses adapted for vision at all distances are called progressive lenses. Progressive ophthalmic lenses usually comprise a far vision region, a near vision region, an intermediate vision region and a main meridian of progression passing through these three regions. French patent 2,699,294, to which reference may be made for further details, describes in its preamble the various elements of a progressive multifocal ophthalmic lens, together with work carried out by the assignee in order to improve the comfort for wearers of such lenses. In short, the upper part of the lens, which is used by the wearer for distance vision, is called the far vision region. The lower part of the lens is called the near vision region, and is used by the wearer for close work, for example for reading. The region lying between these two regions is called the intermediate vision region.

The difference in mean sphere between a control point of the near vision region and a control point of the far vision region is thus called the power addition or addition. These two control points are usually chosen on the main meridian of progression defined below.

For all multifocal lenses, the power in the various far, intermediate and near vision regions, independently of their position on the lens, is determined by the prescription. The latter may comprise just a power value for near vision or a power value for far vision and an addition, and possibly an astigmatism value with its axis and prism.

For progressive lenses, a line called the main meridian of progression is a line used as an optimization parameter; this line is representative of the strategy for using the lens by the average wearer. The meridian is frequently a vertical umbilical line on the multifocal lens surface, i.e. alignment for which all points have zero cylinder. Various definitions have been proposed for the main meridian of progression.

In a first definition, the main meridian of progression is constituted by the intersection of the aspherical surface of the lens and an average wearer's glance when looking straight ahead at objects located in a meridian plane, at different distances; in this case, the meridian is obtained from a definitions of the average wearer's posture—point of rotation of the eye, position of the frame, angle the frame makes with the vertical, near vision distance, etc; these various parameters allow the meridian to be drawn on the surface of the lens. French patent application 2,753,805 is an example of a method of this type in which a meridian is obtained by ray tracing, taking account of the closeness of the reading plane as well as prismatic effects.

A second definition consists in defining the meridian using surface characteristics, and notably isocylinder lines; in this context, an isocylinder line for a given cylinder value represents all those points that have a given cylinder value. On the lens, horizontal segments linking 0.50 diopter isocylinder lines are traced, and the mid-points of these segments are considered. The meridian is close to these midpoints. We can thus consider a meridian formed from three straight line segments which are the best fit to pass through the middles of the horizontal segments joining the two isocylinder lines. This second definition has the advantage of allowing the meridian to be found from measurement of lens surface characteristics, without advance knowledge of the optimization strategy that will be used. With this definition, isocylinder lines for half the power addition can be considered instead of considering 0.50 diopter isocylinder lines.

A third definition of the meridian is proposed in the assignee's Patents. To best satisfy the requirements of presbyopic spectacle wearers and improve progressive multifocal lens comfort, the assignee has proposed adapting the form of the main meridian of progression as a function of power addition, see French patent applications 2,683,642 and 2,683,643. The meridian in those patent applications is formed by three segments forming a broken line. Starting from the top of a lens, the first segment is vertical and has as its lower end, the mounting center (defined below). The top point of the second segment is located at the mounting center and makes an angle α with the vertical which is a function of power addition, for example $\alpha = f_1(A) = 1.574.A^2 - 3.097.A + 12.293$. The second segment has a lower end at a vertical distance on the lens which is also dependent on power addition; this height h is for example given by $h = f_2(A) = 0.340.A^2 - 0.425.A - 6.422$; this formula gives a height in mm, in a reference frame centered on the lens center. The upper end of the third segment corresponds to the point at which the lower end of the second segment is located, and it makes an angle ω with the vertical which is a function of power addition, for example $\omega = f_3(A) = 0.266.A^2 - 0.473.A + 2.967$. In this formula, as in the preceding ones, the numerical coefficients have dimensions suitable for expressing the angles in degrees and the height in mm, for a power addition in diopters. Other relations apart from this can obviously be used for defining a 3-segment meridian.

A point, called the mounting center, is commonly marked on ophthalmic lenses, whether they are progressive or not, and is used by the optician for mounting lenses in a frame. From the anthropometric characteristics of the wearer—pupil separation and height with respect to the frame—the optician machines the lens by trimming the edges, using the mounting center as a control point. In lenses marketed by the assignee, the mounting center is located 4 mm above the geometric center of the lens; the center is generally located in the middle of the micro-etchings. For a lens correctly positioned in a frame, it corresponds to a horizontal direction of viewing, for a wearer holding his/her head upright.

French patent application serial number 0,006,214 filed May 16, 2000 tackles the problem of mounting progressive multifocal lenses in frames of small size: it can happen, when such lenses are mounted in small frames, that the lower portion of the near vision region is removed when the lens is machined. The wearer then has correct vision in the far and intermediate vision regions, but suffers from the small size of the near vision region. The wearer will have a tendency to use the lower part of the intermediate vision region for close work. This problem is particularly acute in view of the current fashion trend towards frames of small size.

Another problem encountered by wearers of progressive multifocal lenses is that of fatigue when performing prolonged work in close or intermediate vision. The near vision region of a progressive lens is indeed located in the bottom part of the lens, and prolonged use of the near vision region can produce fatigue in some spectacle wearers.

One last problem is that of wearer adaptation to such lenses. It is known that spectacle wearers and notably young presbyopic people usually require a period of adaptation to progressive lenses before being able to appropriately use the various regions of the lens for corresponding activities. This problem of adaptation is also encountered by people who formerly wore bifocal lenses; such lenses have a special near vision portion the upper part of which is generally located 5 mm below the geometric center of the lens. Now, in conventional progressive lenses, the near vision region is generally situated lower; even if it is difficult to exactly pinpoint the limit between the intermediate vision region and the near vision region, a wearer would suffer significant fatigue by using progressive lenses for near vision at 5 mm below the mounting center.

SUMMARY OF THE INVENTION

The invention proposes a solution to these problems by providing a lens of generalized optical design, suited to all situations. It provides in particular a lens able to be mounted in small size frames, without the near vision region getting reduced. It also improves wearer comfort with prolonged use of the near vision or intermediate vision regions. It makes it easier for younger presbyopic wearers and former wearers of bifocal lenses to adapt to progressive lenses. More generally, the invention is applicable to any lens having a rapid variation in power.

More precisely, the invention provides a progressive multifocal ophthalmic lens comprising an aspherical surface with at every point thereon a mean sphere and a cylinder, a far vision region, an intermediate vision region and a near vision region, a main meridian of progression passing through the three regions, a power addition equal to a difference in mean sphere between a near vision region control point and a far vision region control point, a progression length less than 12 mm, progression length being equal to the vertical distance between a mounting center and a point on the meridian where mean sphere is greater than mean sphere at the far vision control point by 85% of the power addition value, in which the ratio between firstly, the integral of the product of cylinder times the norm of sphere gradient, on a 40 mm diameter circle centered on the center of the lens, and secondly, the product of the area of this circle, power addition and a maximum value of the norm of sphere gradient over that part of the meridian comprised within the circle, is less than 0.14.

The invention also provides a multifocal ophthalmic lens comprising an aspherical surface with at every point thereon a mean sphere and a cylinder, a far vision region, an intermediate vision region and a near vision region, a main meridian of progression passing through the three regions, a power addition equal to a difference in mean sphere between a near vision region control point and a far vision region control point, a progression length less than 12 mm, progression length being equal to the vertical distance between a mounting center and a point on the meridian where mean sphere is greater than mean sphere at the far vision control point by 85% of the power addition value, in which the ratio between firstly, the integral of the product of cylinder times the norm of sphere gradient, on a 40 mm diameter circle centered on the center of the lens, and secondly, the product of the area of this circle, power addition and a maximum value of the norm of sphere gradient on that part of the meridian comprised within the circle, is less than 0.16 times the ratio between a maximum value of the norm of sphere gradient on that part of the meridian comprised within the circle; and a maximum value for the norm of sphere gradient within the circle.

In both cases, the ratio between the product of cylinder times the norm of sphere gradient, and the square of power addition is advantageously less than 0.08 $mm^{-1}$ at every point within a 40 mm diameter disc centered on the center of the lens, and cylinder within that part of the disc situated above the mounting center is advantageously less than 0.5 times power addition.

In one embodiment, the main meridian of progression is an umbilical line. It can also be substantially formed by the mid-points of horizontal segments joining lines formed by 0.5 diopter cylinder points, or be formed by three segments constituting a broken line.

In this latter case, the first segment is advantageously vertical and has the mounting center as its lower end. The upper end of the second segment can be formed by the mounting center, and the segment can make an angle $\alpha$, which is a function of power addition, with the vertical. In this case, angle $\alpha$ is given by $\alpha=f_1(A)=1.574.A^2-3.097.A+12.293$, where A is power addition.

The second segment can have a lower end at a height h which is a function of power addition. In this case, the height h of the lower end of the second segment is preferably given, in mm, in a reference frame centered on the center of the lens by the function $h=f_2(A)=0.340.A^2-0.425.A-6.422$, where A is power addition.

Finally, the third segment can make an angle $\omega$ which is a function of power addition, with the vertical. The angle $\omega$ is preferably given by $\omega=f_3(A)=0.266.A^2-0.473.A+2.967$, where A is power addition Further characteristics and advantages of the invention will become more clear from the detailed description which follows of some embodiments of the invention provided by way solely of example, and with reference to the drawings.

DETAILED DESCRIPTION OF THE INVENTION

In a first series of criteria, the invention proposes minimising the product, at each point, of slope of sphere multiplied by cylinder. This quantity is representative of aberrations of the lens: it is clearly zero for a spherical lens. Slope of sphere is representative of local variations in sphere and is all the smaller as lens progression is small i.e. is not sudden. It is nevertheless necessary, to ensure progression, that the slope of sphere does not have nonzero values over the whole lens, and notably on the main meridian of progression.

Cylinder is representative of how much the local surface deviates from a spherical surface; it is useful for this to remain low in the region of the lens employed for vision—which, in geometric terms, amounts to "distancing" or "spreading" the isocylinder lines from the meridian. Variations in sphere lead of necessity to variations in cylinder, and cylinder cannot be minimized over the whole lens surface.

The product (slope of sphere×cylinder) represents a balance or tradeoff between controlling slope of sphere and a desire to spread the isocylinder lines. For a lens in which the maximum sphere slope were to be found on the meridian and in which the meridian was an umbilical line, this product would be zero on the meridian and would have a small value in the region thereof. When one moves away from the meridian, cylinder values can increase but the product can remain small if the slope of sphere is itself small: this is preferable in areas far removed from the meridian, as progression of sphere is in fact only functional in the progression "corridor" around the meridian. In other words, setting a limit on the product of (slope of sphere times cylinder) over the surface of the lens involves minimising cylinder in the foveal region, while minimising slope of sphere in the extra-foveal region. One simultaneously ensures good foveal vision, and good peripheral vision. The product of slope of sphere multiplied by cylinder is consequently a quantity that represents lens surface aberrations.

This product is minimized on the lens surface within a 40 mm diameter circle—ie within a 20 mm radius around the lens center; this amounts to excluding regions at the edge of a lens which are infrequently or not at all used by the lens wearer, particularly in the case of small size frames. Generally, in Europe, frames are considered as being small frames when frame height (Boxing B dimension, ISO 8624 standard on spectacle frame measuring systems) is less than 35 mm. In the United States, a frame is considered of small size for a Boxing B dimension less than 40 mm; these are average values.

The invention also proposes normalizing this product, to obtain a quantity which is not a function of power addition. The normalization factor involves the addition. Addition is a factor adapted, firstly, to normalization of the slope of sphere over the lens surface: variation in sphere between the far vision control point and the near vision control point is equal to power addition, and the slope of sphere is consequently directly a function of power addition, for given progression lengths. Power addition is, secondly, a factor suited to normalization of cylinder: the higher power addition is, the greater the cylinder—cylinder being zero for a spherical lens. The square of addition consequently represents a normalization factor adapted to the product of cylinder and slope of sphere.

Thus, the invention proposes setting a constraint on the following quantity:

$$\frac{\text{Max}_{disque40}(C \cdot gradS)}{A^2}$$

In this formula, gradient is defined conventionally as the vector the coordinates of which along this axis are respectively equal to the partial derivatives of mean sphere along this axis, and, although this is misuse of language, we call the norm of the gradient vector the gradient, i.e.:

$$gradS = \|\overrightarrow{gradS}\| = \sqrt{\left(\frac{\partial S}{\partial x}\right)^2 + \left(\frac{\partial S}{\partial y}\right)^2}$$

C is cylinder; we consider the maximum over the whole 40 mm diameter disc centered on the center of the lens; in the denominator we have as the normalization factor, the square of power addition.

The ratio has the dimension of the inverse of a distance.

It is advantageous for the maximum value of this normalized product to be as small as possible. An upper limit of $0.08 \text{ mm}^{-1}$ is suitable. Setting a limit to the maximum value of the product does indeed amount to limiting the product at all points on the 40 mm diameter disc.

This limit on the normalized quantity is combined with other characteristics of a lens. The fact that the lens is a lens with a short progression can be written as a constraint on progression length: the progression length is representative of the vertical height on the lens over which sphere varies; the faster sphere varies on the lens, the smaller progression length is. Progression length can be defined as the vertical distance between the mounting center and the point on the meridian where mean sphere is greater by 85% of the power addition value than mean sphere at the far vision region control point. The invention consequently proposes that the progression length be less than 12 mm.

The invention also proposes minimizing the maximum value of cylinder in the upper portion of the lens; this amounts to limiting cylinder in the top part of the lens, in other words ensuring that cylinder remains low in the far vision region. The far vision region is consequently kept free of cylinder. Quantitatively, this condition is expressed as an inequality between maximum cylinder value and half the value of power addition. Choosing an upper limit which is a function of power addition allows the condition to be normalized and this is applicable to all power additions and base power values for a family of lenses.

The upper portion of the lens is limited to that part of the lens situated above the mounting center, inside a 40 mm diameter circle: this is substantially the far vision region, limited at the bottom by a horizontal line passing through the mounting center; the region is limited at the sides as well as at the top by the 40 mm diameter circle. This circle corresponds to the limits of the useful area of the lens, for foveal or extra-foveal vision.

These two conditions ensure cylinder-free far vision, correct foveal vision, suitable extra-foveal vision and this despite the short length of progression of the lens.

In the remainder of this description we shall consider, by way of example, a lens with an aspherical surface directed towards the object space and a spherical or toric surface directed towards the spectacle wearer. In the example, we shall consider a lens intended for the right eye. The lens for the left eye can be obtained simply by symmetry of this lens with respect to a vertical plane passing through the geometric center. We shall use an orthonormal co-ordinate system in which the x-axis corresponds to the horizontal axis of the lens and the y-axis to the vertical axis; the center O of the reference frame is the geometric center of the aspherical surface of the lens. In the description which follows, the axes are graduated in millimeters. We shall take in the example below a lens having a power addition of 2 diopters, with a base value or sphere at the far vision control point of 1.75 diopters.

Figure 1:
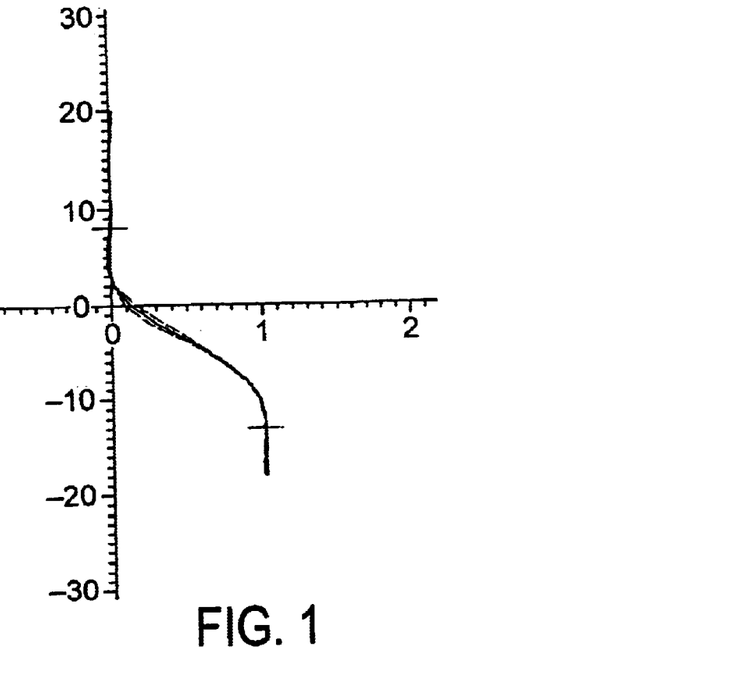
FIG. 1 is a graph of mean sphere along the meridian of a lens according to the invention, of one diopter addition.

FIG. 1 is a graph of mean sphere along the meridian of a lens according to the invention, for 1 diopter power addition. The x-axis is graduated in diopters and y-axis values in mm for the lens are shown on the y-axis. The desired meridian is defined as explained above, by three straight line segments, the position of which depends on the power addition. In the example, the angle $\alpha$ between the second segment and the vertical is 10.8°, and its lower end is at −6.5 mm on the y-axis, i.e. is at 6.5 mm below the center of the lens. The third segment makes an angle $\omega$ of 2.8° with the vertical. The meridian slopes towards the nasal side of the lens. The meridian obtained after optimizing the lens surface, defined as the locus of the mid-points of horizontal segments between 0.5 diopter isocylinder lines, substantially coincides with the desired meridian.

The far vision control point has a y-axis value of 8 mm on the surface, and has a sphere of 1.75 diopters and a cylinder of 0 diopters. The near vision control point has a y-axis value of −12 mm on the surface, and has a sphere of 2.75 diopters and a cylinder of 0 diopters. In the example, the nominal lens power addition—one diopter—is equal to power addition calculated as a difference between mean sphere at the control points. On FIG. 1, mean sphere is shown in a solid line and the principal curves $1/R_1$ and $1/R_2$ in dashed lines.

The progression length for the lens in FIG. 1 is 11.5 mm. In fact, a mean sphere of 1.75+0.85*1=2.60 diopters is reached at a point having a y-axis value of −7.5 mm on the meridian. As the mounting center has a y-axis co-ordinate of 4 mm, the progression length is indeed 11.5 mm.

Figure 2:
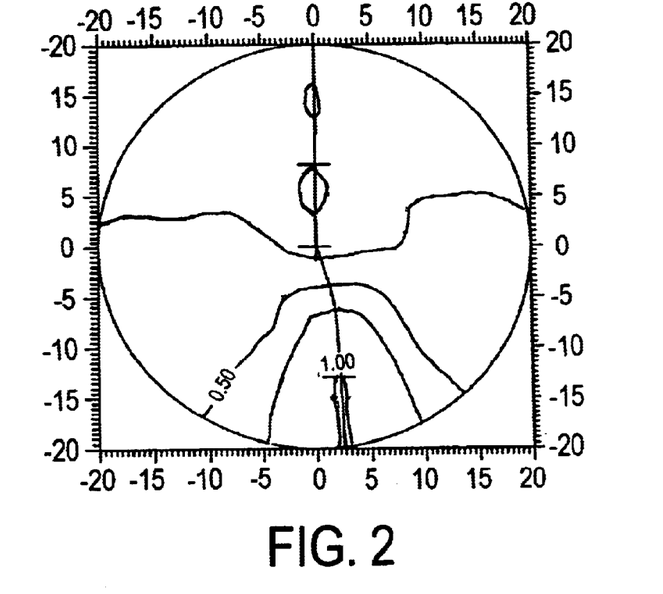
FIG. 2 is a mean sphere map of the lens of FIG. 1.

FIG. 2 is a map showing mean sphere for the lens in FIG. 1. The map in FIG. 2 shows the projection of the aspherical surface of a lens onto the (x, y) plane; the (x, y) reference frame defined above as well as the main meridian of progression will be recognised. The control points for far and near vision have respective coordinates of (0; 8) and (2.5; −1.3). The near vision control point x-axis value can vary as a function of power addition, as described in French patent applications 2,683,642 and 2,683,643.

On FIG. 2, isosphere lines, in other words lines joining points having the same mean sphere value can be seen. Lines are shown for mean sphere values in 0.25 diopter steps, mean sphere being calculated with respect to control point mean sphere for far vision. FIG. 2 shows the 0 diopter isosphere line which passes through the far vision control point; it also shows the 0.25 diopter, 0.5 diopter, 0.75 diopter and 1.00 diopter isosphere lines. The 0.25 diopter isosphere line is substantially horizontal and in the middle of the lens; the 0.75 diopter isosphere line is located in the bottom portion of the lens around the near vision control point.

FIG. 2 also shows the 40 mm diameter circle centered on the center of the lens inside of which the product of slope of sphere times cylinder is considered. Inside this circle—in other words on the 40 mm diameter disc—the product of cylinder times slope of sphere is at a maximum at a point with coordinates x=7 mm and y=−6.5 mm, where it reaches 0.06 diopters$^2$/mm. Because of this, the ratio between, firstly, the maximum value of the product of cylinder times the norm for sphere gradient on the 40 mm diameter disc centered on the lens center and, secondly, the square of power addition is equal to 0.06 mm$^{-1}$. This ratio is well below 0.08 mm$^{-1}$.

Figure 3:
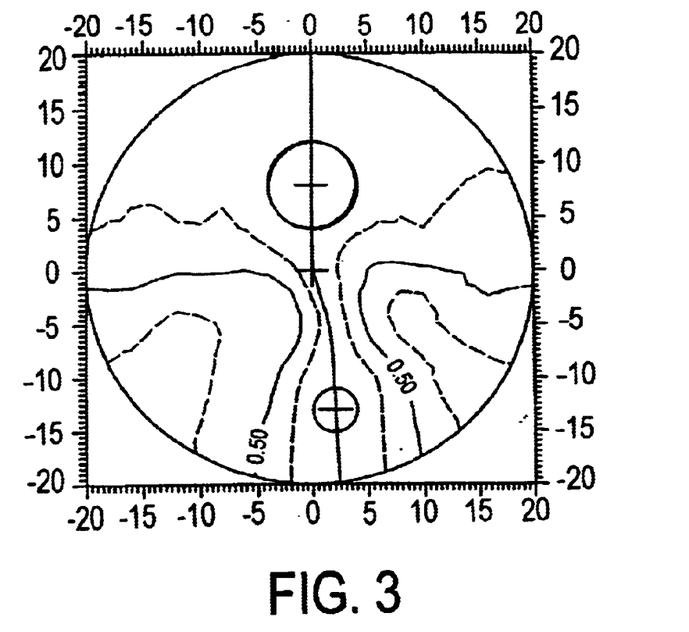
FIG. 3 is a cylinder map of the lens of FIG. 1.

FIG. 3 shows a map of cylinder for a lens according to the invention; the same graphical conventions and indications as those of FIG. 2 are used, simply showing cylinder in place of sphere in this drawing. From the point of view of isocylinder lines, FIG. 3 shows that the lines are well spaced in the far vision region, come closer together in the intermediate vision region and are again well spaced, even inside a small mounting frame. Cylinder above the mounting center is a maximum at the point with coordinates x=19.5 mm and y=4 mm, where it reaches 0.37 diopters. This cylinder is well below 0.5 times power addition, in other words 0.5 diopters for a 1 diopter addition.

Figure 4:
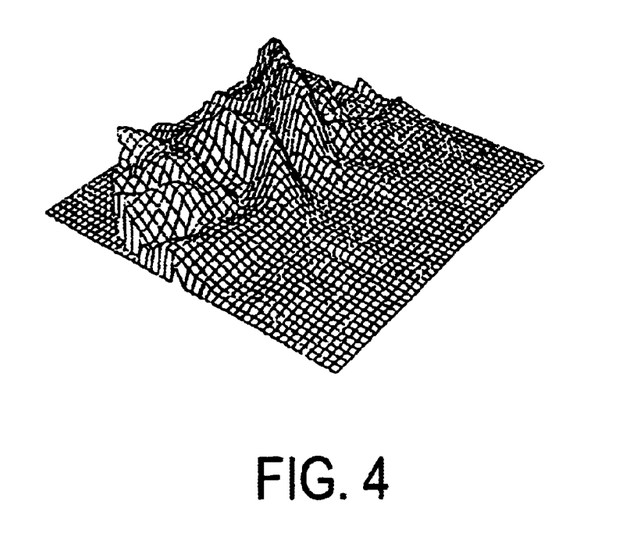
FIG. 4 is a 3-dimensional representation of the product (slope of sphere times cylinder), for the lens of FIG. 1.

FIG. 4 is a three-dimensional representation of the product of slope of sphere times cylinder, for the lens in FIGS. 1–3. The meridian is substantially horizontal in FIG. 4, and the far vision region is to the right. It will be noticed that this product has a maximum value in two areas located at each side of the near vision region; the far vision region is well clear as is the corridor surrounding the main meridian of progression.

Figure 5:
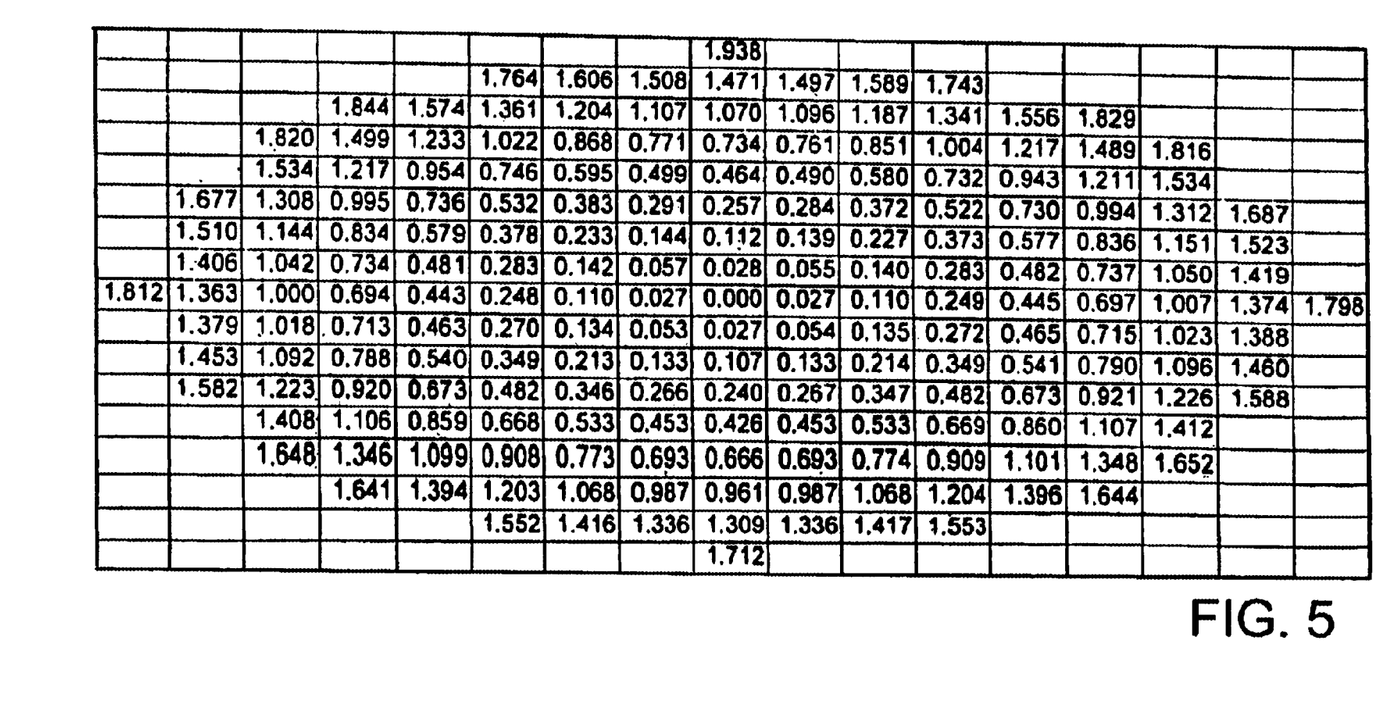
FIG. 5 is a map of altitudes for the lens in FIGS. 1–4.

FIG. 5 is a map of altitude for the lens in FIG. 1. We have shown altitudes for various points on the surface, along the z-axis. The points for which altitude appears on the drawing are sampled with a 2.5 mm step in the x direction and y direction, within the 40 mm diameter circle.

Figure 6:
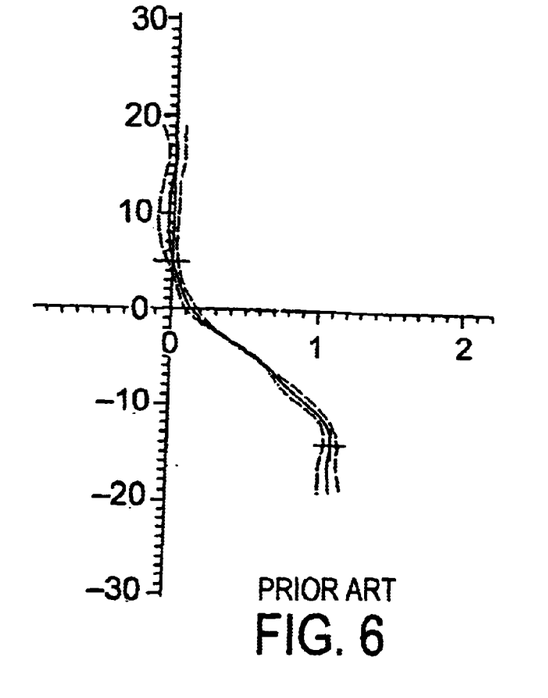
FIGS. 6–9 show a graph, maps and a representation similar to those of FIGS. 1–4, for a prior art lens.
Figure 7:
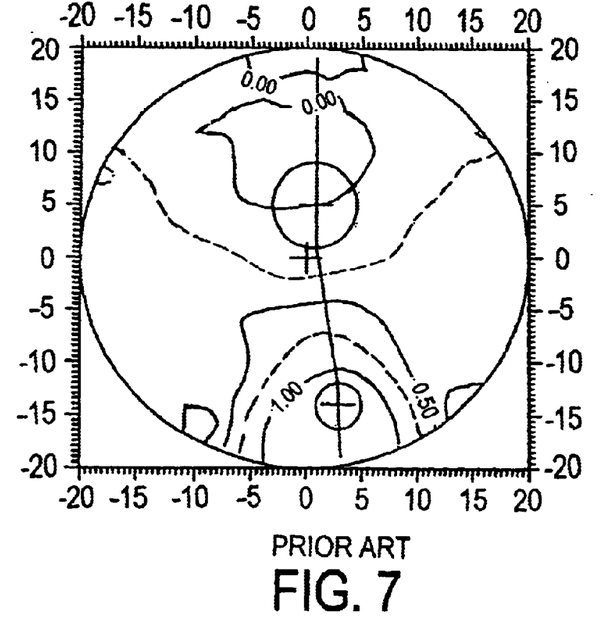
Figure 8:
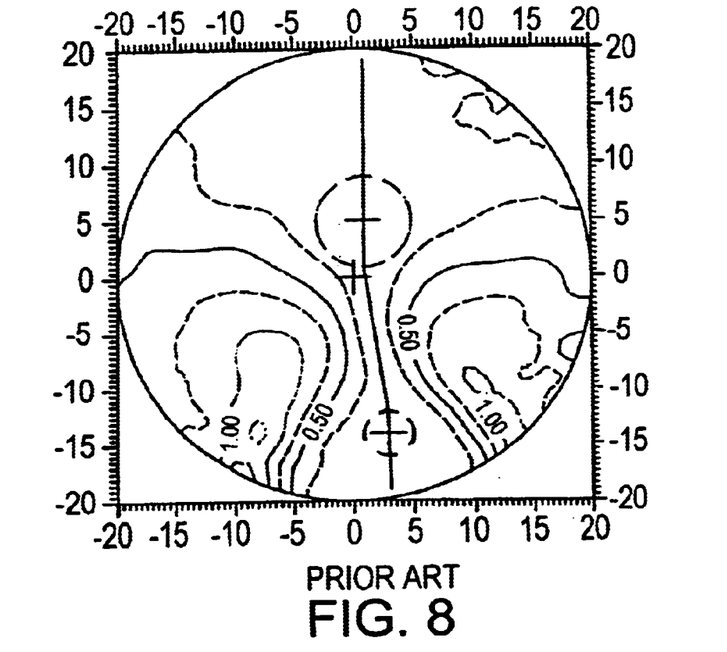
Figure 9:
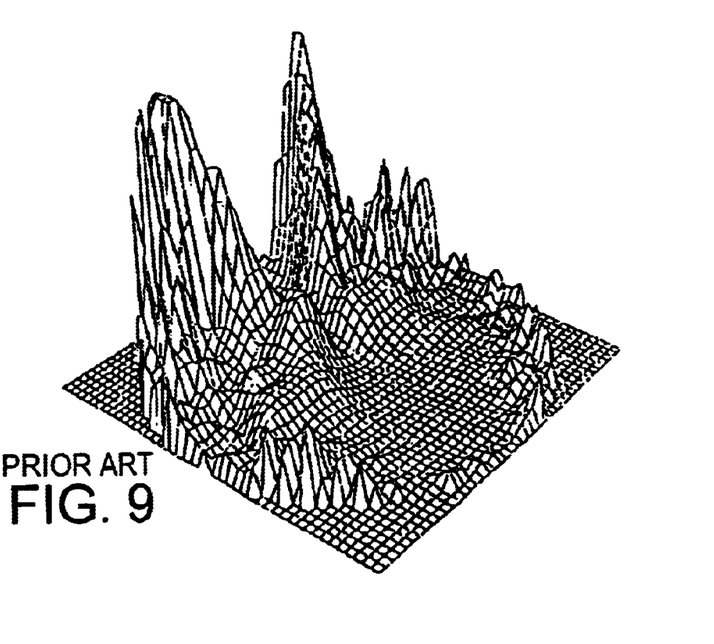

FIGS. 6, 7 and 8 show, respectively, a graph for mean sphere along the meridian, a map of mean sphere and a map for cylinder of a prior art lens of 1 diopter power addition; for the purposes of comparison, the 40 mm diameter circle already shown on FIGS. 2 and 3 has been added. FIG. 9 shows, like FIG. 4, a representation of the product of slope of sphere times cylinder. A simple comparison of FIG. 6 with FIG. 1, of FIG. 7 with FIG. 2, and FIG. 8 with FIG. 3 or FIG. 9 with FIG. 4 highlights the problems in the prior art for small size frames, and the solution provided by the invention.

FIG. 9 shows that the product of gradient times mean sphere has larger maximum values, and more pronounced local perturbations.

For the prior art lens of FIGS. 6–9, a length of progression of 11.9 mm and a ratio between the maximum value of the product of cylinder times the norm for sphere gradient and the square of power addition is equal to 0.23 mm$^{-1}$. The maximum value of cylinder above the mounting center is 0.55 diopters, equivalent to a ratio to power addition of 0.55. This comparative example shows that the invention, despite a shorter length of progression, allows aberrations on the non-spherical surface of the lens and in the far vision region to be limited.

In a second series of criteria, the invention proposes minimizing a quantity representative of lens surface aberrations; this quantity is the integral of the product, at each point, of slope of sphere times cylinder. This quantity is clearly zero for a spherical lens; the slope of sphere is representative of local variations in sphere, and is all the smaller when the lens is less progressive, i.e. has a progression which is not too pronounced. It is nevertheless necessary, to ensure progression, for the slope of sphere not to have nonzero values over the whole lens.

Cylinder is representative of the degree of deviation between local surface and a spherical surface; it is useful when this remains low in the region of the lens used for vision—which, in geometrical terms, amounts to "spacing" or "opening out" the isocylinder lines from the meridian.

Variations in sphere nevertheless of necessity lead to variations in cylinder.

The product of slope of sphere times cylinder represents a balance or tradeoff between controlling sphere slope and a desire to move the isocylinder lines apart. For a lens in which the maximum slope of sphere were to be found on the meridian and in which the meridian was an umbilical line, the product would be zero on the meridian and would have small values in the region thereof. When moving away from the meridian, values for cylinder can increase but the product can remain small if slope of sphere is itself small: this is preferable in regions far from the meridian since progression in sphere is in practice only functional in the progression corridor around the meridian. The product takes on significant values when slope of sphere is high in regions of aberration, which is not desirable as progression in sphere is only functional within the progression corridor where cylinder should remain low.

Stated otherwise, setting a limit for the product of slope of sphere times cylinder over the surface of a lens implies minimizing cylinder in the foveal region while at the same time minimizing slope of sphere in the extra-foveal region. One simultaneously guarantees good foveal vision and good peripheral vision. The product of slope of sphere times cylinder is consequently a quantity representative of aberrations over the lens surface.

The integral is calculated on the surface of the lens inside of the 40 mm diameter circle—ie within a 20 mm radius around the center of the lens; this amounts to excluding zones at the edge of the lens which are only rarely if at all used by the spectacle wearer.

The invention also proposes normalizing this integral to obtain a magnitude which is not a function of power addition. The normalization factor involves maximum slope of sphere on the meridian and power addition. The maximum value of slope of sphere on the meridian is a factor suited to normalization of the slope of sphere over the lens surface: again, slope of sphere is functional in the corridor surrounding the meridian, and the slope of sphere is advantageously at a maximum on the meridian. Power addition is a factor suited to cylinder normalization: the higher the power addition, the greater the cylinder—a spherical lens having zero cylinder. The product is multiplied by the area of the same 40 mm diameter circle, so as to be homogeneous with the integral in the numerator.

Thus, for the second series of criteria, the invention proposes setting a constraint on the following quantity:

$$\frac{\iint_{cercle40} gradS \cdot C \cdot dS}{A \cdot Aire_{cercle40} \cdot Gradmer}$$

In this formula, A represents power addition, $Aire_{cercle40}$ the area of the 40 mm diameter circle, and Gradmer is the maximum for gradient of sphere gradS on the part of the meridian comprised within the 40 mm diameter circle. The gradient is defined conventionally as the vector the coordinates of which along each axis are respectively equal to the partial derivatives of mean sphere along this axis, and, with slight misuse of language, we call the gradient the norm of the gradient vector, i.e.:

$$gradS = \|\overrightarrow{gradS}\| = \sqrt{\left(\frac{\partial S}{\partial x}\right)^2 + \left(\frac{\partial S}{\partial y}\right)^2}$$

The integral in the numerator is an integral for the surface over the whole 40 mm diameter circle centered on the lens center; the quantity in the denominator is a normalization. The whole expression is dimensionless.

It is advantageous for this normalized quantity to be as small as possible. Various upper limits can be proposed. In a first embodiment of the invention, this normalized quantity is less than a constant value k, equal to 0.14.

In another embodiment, this normalized quantity is less than the product k'.Gradmer/Gradmax with Gradmer defined as above (maximum value of the slope of sphere over that part of the meridian comprised within the 40 mm diameter circle); and Gradmax being the maximum value of the slope of sphere within the 40 mm diameter circle, and k' being a coefficient equal to 0.16. This coefficient is dimensionless since Gradmer like Gradmax have the same dimension.

This limit to the normalized quantity is combined with other characteristics of the lens. The fact that the lens is a lens with a short progression can be written as a constraint on progression length: progression length is representative of the vertical distance on the lens over which sphere varies; the more rapidly sphere varies over the lens, the smaller the progression length is. Progression length can be defined as the vertical distance between the mounting center and a point on the meridian where mean sphere is greater than mean sphere at the far vision region control point by 85% of the power addition value.

The lens in FIGS. 1–5 satisfies not only the first series of criteria, as explained above, but also the second series of criteria; it satisfies the second series of criteria in the first embodiment (normalized integral less than 0.14) as well as in the second embodiment (normalized integral less than k'.Gradmer/Gradmax).

More specifically, for this lens, the quantity Gradmer is reached at the −3 mm y-axis co-ordinate on the meridian, and is equal to 0.11 diopters/mm. The quantity Gradmax is reached at a point with coordinates (7 mm, −9 mm), and is equal to 0.11 diopters/mm. The normalized integral is equal to 0.12; this quantity is, firstly, well below 0.14; this lens consequently satisfies the second series of criteria in the first embodiment. Additionally, the ratio Gradmer/Gradmax is equal to 1, and the normalized integral is well below 0.16*1. This lens consequently satisfies the second series of criteria, in the second embodiment.

We shall now discuss in detail the various characteristics allowing the various lenses according to the invention to be obtained. The lens surface is, as is known, continuous and continuously derivable three times. As those skilled in the art know, a desired surface for progressive lenses is obtained by digital optimization using a computer, while setting limiting conditions for a certain number of lens parameters.

One or several of the criteria defined above, and notably the criteria of claim 1, can be used as limiting conditions.

One can also advantageously start by defining, for each lens in the family, a main meridian of progression. For this, the teachings of French patent application 2,683,642 referred to above can be used. Any other definition of main meridian of progression can also be used to apply the teachings of this invention. Advantageously, the main meridian of progression substantially coincides with the line formed from the mid-points of horizontal segments the ends of which have a value for cylinder of 0.5 dioptes. The lens is consequently symmetrical horizontally in terms of cyclinder with respect to the meridian. This favours lateral vision.

In the above description, we have considered the definition of the meridian given in the assignee's patent applications; we have also considered the definition of progression length given above. Other definitions for meridian can be used.

Obviously, the present invention is not limited to what has been described: among other things, the aspherical surface could be the surface directed towards the spectacle wearer. Additionally, we have not insisted on describing the existence of lenses which can differ for the two eyes. Finally, if the description gives an example for a lens with a power addition of 1 diopter and a base of 1.75 diopters, the invention also applies to lenses whatever the wearer's prescription may be. More generally, the invention can be applied to any lens having a variation in power.

Finally, the invention has been described with reference to a lens which simultaneously satisfies the first series of criteria and the second series of criteria. One could also provide a lens which only satisfies the criteria of the first series or, yet again, which only satisfies the criteria of the second series.

What is claimed is:

1. A progressive multifocal ophthalmic lens comprising an aspherical surface with at every point thereon a mean sphere (S) and a cylinder (C), a far vision region, an intermediate vision region and a near vision region, a main meridian of progression passing through said three regions, a power addition equal to a difference in mean sphere between a near vision region control point and a far vision region control point, a progression length less than 12 mm, progression length being equal to the vertical distance between a mounting center and a point on said meridian where mean sphere is greater than mean sphere at the far vision control point by 85% of the power addition value, in which the ratio between firstly, the integral of the product of cylinder times the norm of sphere gradient, on a 40 mm diameter circle centered on the center of the lens, and secondly, the product of the area of said circle, power addition and a maximum value of the norm of sphere gradient over that part of the meridian comprised within said circle, is less than 0.14.

2. The lens of claim 1, wherein the main meridian of progression is an umbilical line.

3. The lens of claim 1, wherein the main meridian of progression is substantially formed by the mid-points of horizontal segments joining lines formed by 0.5 diopter cylinder points.

4. The lens according to claim 1, wherein the main meridian of progression is formed by three segments constituting a broken line.

5. The lens of claim 4, wherein the first segment is vertical and has the mounting center as its lower end.

6. The lens according to claim 4, wherein the upper end of the second segment is formed by the mounting center, said segment making an angle $\alpha$, which is a function of power addition, with the vertical.

7. The lens of claim 6, wherein the angle $\alpha$ is given by $\alpha=f_1(A)=1.574.A^2-3.097+12.293$, where A is power addition.

8. The lens of claim 4, wherein the second segment has a lower end at a height h which is a function of power addition.

9. The lens of claim 8, wherein the height h of the lower end of said second segment is given, in mm, in a reference frame centered on the center of the lens by the function $h=f_2(A)=0.340.A^2 0.425.A-6.422$, where A is power addition.

10. The lens of claim 4, wherein the third segment makes an angle $\omega$ which is a function of power addition, with the vertical.

11. The lens of claim 10, wherein angle $\omega$ is given by $\omega=f_3(A)=0.266.A^2-0.473.A+2.967$, where A is power addition.

12. A progressive multifocal ophthalmic lens comprising an aspherical surface with at every point thereon a mean sphere (S) and a cylinder (C), a far vision region, an intermediate vision region and a near vision region, a main meridian of progression passing through said three regions, a power addition equal to a difference in mean sphere between a near vision region control point and a far vision region control point, a progression length less than 12 mm, progression length being equal to the vertical distance between a mounting center and a point on said meridian where mean sphere is greater than mean sphere at the far vision control point by 85% of the power addition value, in which the ratio between firstly, the integral of the product of cylinder times the norm of sphere gradient, on a 40 mm diameter circle centered on the center of the lens, and secondly, the product of the area of this circle, power addition and a maximum value of the norm of sphere gradient on that part of the meridian comprised within said circle, is less than 0.16 times the ratio between a maximum value of the norm of sphere gradient on that part of the meridian comprised within said circle; and a maximum value for the norm of sphere gradient within said circle.

13. The lens of claim 12, wherein the main meridian of progression is an umbilical line.

14. The lens of claim 12, wherein the main meridian of progression is substantially formed by the mid-points of horizontal segments joining lines formed by 0.5 diopter cylinder points.

15. The lens according to claim 12, wherein the main meridian of progression is formed by three segments constituting a broken line.

16. The lens of claim 15, wherein the first segment is vertical and has the mounting center as its lower end.

17. The lens according to claim 15, wherein the upper end of the second segment is formed by the mounting center, said segment making an angle $\alpha$, which is a function of power addition, with the vertical.

18. The lens of claim 17, wherein the angle $\alpha$ is given by $\alpha=f_1(A)=1.574.A^2-3.097.A+12.293$, where A is power addition.

19. The lens of claim 15, wherein the second segment has a lower end at a height h which is a function of power addition.

20. The lens of claim 19, wherein the height h of the lower end of said second segment is given, in mm, in a reference frame centered on the center of the lens by the function $h=f_2(A)=0.340.A^2-0.425.A-6.422$, where A is power addition.

21. The lens of claim 15, wherein the third segment makes an angle $\omega$ function of power addition, with the vertical.

22. The lens of claim 21, wherein angle $\omega$ is given by $\omega=f_3(A)=0.266.A^2-0.473.A+2.967$, where A is power addition.

* * * * *

UNITED STATES PATENT AND TRADEMARK OFFICE
CERTIFICATE OF CORRECTION

PATENT NO. : 6,682,194 B1
DATED : January 27, 2004
INVENTOR(S) : Francoise Ahsbahs and Pierre Devie It is certified that error appears in the above-identified patent and that said Letters Patent is hereby corrected as shown below:

<u>Title page,</u>
Item [75], Inventors, "Francoise Ahsbahs, Saint Maur des Fosses (FR)" should read
-- Francoise Ahsbahs, Saint Maur Des Fosses (FR) --
Item [30], Foreign Application Priority Data, "01 01411" should read -- 01 01 411 --

<u>Column 10,</u>
Line 40, replace "This" with -- The --

<u>Column 11,</u>
Line 50, after "-3.097" insert -- A --
Line 58, replace "h = $f_2(A)$ = 0.340.$A^2$0.425.A-6.422" with
-- h = $f_2(A)$ = 0.340·$A^2$-0.425·A-6.422 --

Signed and Sealed this

Twenty-fifth Day of May, 2004

JON W. DUDAS
*Acting Director of the United States Patent and Trademark Office*